July 22, 1969  S. C. GUPTA  3,457,091
GLASS BONDED ALUMINA
Filed March 19, 1965
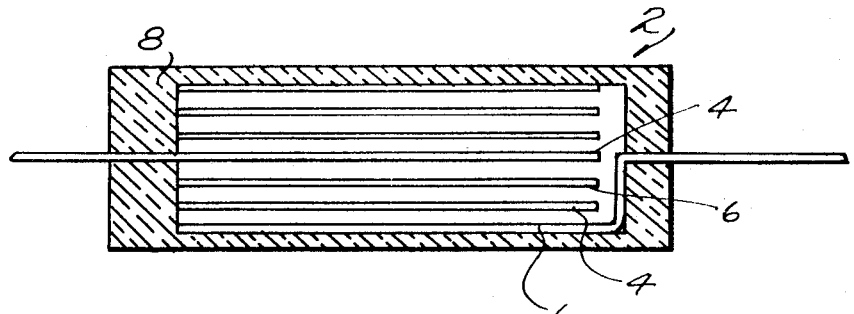
*Fig. 1.*
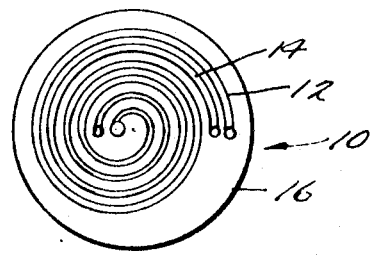
*Fig. 2.*
*Fig. 3.*
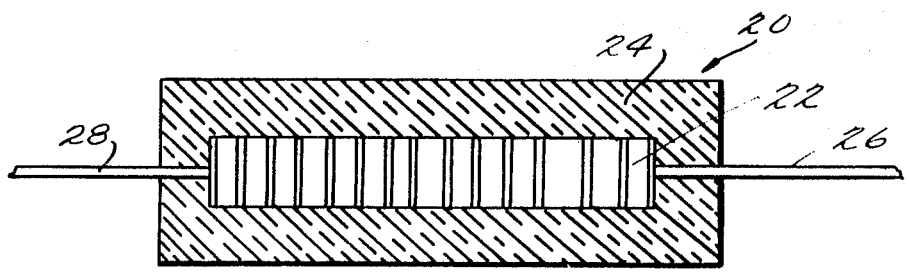
*Fig. 4.*
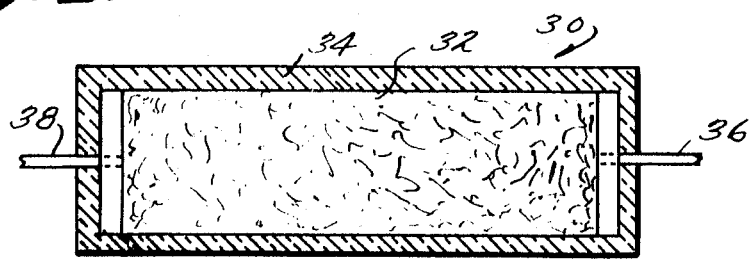
INVENTOR
SUBODH C. GUPTA
BY Cushman, Darby & Cushman
ATTORNEYS

United States Patent Office 3,457,091
Patented July 22, 1969

3,457,091
GLASS BONDED ALUMINA
Subodh C. Gupta, Raynham, Mass., assignor to Haveg Industries, Inc., Wilmington, Del., a corporation of Delaware
Filed Mar. 19, 1965, Ser. No. 441,249
Int. Cl. C04b *35/18, 33/26*
U.S. Cl. 106—39    11 Claims

ABSTRACT OF THE DISCLOSURE

Insulating material is molded from a mixture of a glass frit and powdered alumina.

---

This invention relates to novel alumina containing compositions and to articles made therefrom.

It is normally difficult to mold alumina. It cannot be used with all electrical components because the electrical conductor, e.g., copper or silver wire, is melted at the temperature required. Previous attempts to employ alumina in making glass bonded parts similar to glass bonded natural mica or glass bonded synthetic mica (Havelex or Mycalex) have been unsuccessful.

Glass bonded mica (either natural or synthetic mica) has been successfully employed in the manufacture of resistors, capacitors and similar electrical insulating articles. In operation the resistors, capacitors and the like break down due to heat build up.

It is an object of the present invention to develop an insulating encapsulation composition which can give longer life to resistors, capacitors and the like due to a larger heat dissipation ability than conventional glass bonded mica compositions.

Another object is to make compositions suitable for making glass bonded alumina articles.

A further object is to prepare vitreous encapsulated electrical insulating articles.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by utilizing calcined types of aluminas which usually are in plate-like form. It is known that levigated alumina is of such type and is prepared by settling the alumina in water and decanting out.

The formulation for preparing glass bonded alumina is as follows:

|  | Percent |
|---|---|
| Levigated alumina | 20 to 75 |
| Frit | 20 to 75 |
| Cryolite | 0 to 7 |
| Mica (natural or synthetic) | 0 to 10 |

The powdered alumina is the main filler and as indicated is usually in the form of platey particles.

The frit is the matrix and many different types of leaded and non-leaded frits have given good results. The leaded frit is lead borate or a lead borosilicate glass. As unleaded frits there can be used any of the frits conventionally used in the glass bonded mica art. Typical examples of such frits are those disclosed in Michael Patent 2,566,902, Monack Patent 2,391,376, Wedlock Patent 2,303,244. The low melting frits are preferred.

The cryolite assists in the flowability of the mix when it is employed. It is normally used in an amount of at least 0.5% and normally not over 7% although it can be as much as 8 or 10%.

The mica (natural or synthetic) in small amounts, e.g., at least 0.5%, assists in handling of the hot preform and in flowability of the mix.

Unless otherwise indicated all parts and percentages are by weight.

The above range of materials is useful in compression molding the finished article. For transfer molding a more restricted range is preferred such as:

|  | Percent |
|---|---|
| Levigated alumina | 20 to 60 |
| Frit | 35 to 75 |
| Cryolite | 5 |
| Mica | 5 |

The normal method of molding the composition is to make a preform or "cookie" under pressure and heat to 1200 to 1800° F., preferably 1500° F. to sinter the grains. The hot preform is then placed in a mold cooler than the preform but well above room temperature, e.g., 600 to 800° F., preferably 700° F. and then molding, e.g., at 600 to 20,000 p.s.i., usually at about 10,000 p.s.i.

Typical examples of suitable molding compositions within the present invention are given in the following examples.

Example 1

|  | Percent |
|---|---|
| Levigated alumina | 55 |
| Lead borate frit | 40 |
| Cryolite | 5 |

Example 2

|  | |
|---|---|
| Levigated alumina | 40 |
| Lead borate frit | 55 |
| Cryolite | 5 |

Example 3

|  | |
|---|---|
| Levigated alumina | 30 |
| Lead borate frit | 60 |
| Mica | 5 |
| Cryolite | 5 |

Example 4

|  | |
|---|---|
| Levigated alumina | 45 |
| Unleaded frit | 40 |
| Cryolite | 5 |
| Synthetic mica | 10 |

The unleaded frit can be composed of cryolite 20.5%, barium carbonate 9.6%, aluminum trihydrate 15.5% and boric acid 54.4% and prepared as set forth in Michael Patent 2,566,902.

The compositions of the present invention when employed in preparing encapsulated resistors and capacitors give products having much larger heat dissipation than is the case with glass bonded mica compositions.

The invention will be understood best in connection with the drawings wherein:

FIGURE 1 is a sectional view of a molded capacitor made according to the invention;

FIGURE 2 is a sectional view of another type of molded capacitor according to the invention;

FIGURE 3 is a sectional view of a molded encapsulated resistor according to the invention; and FIGURE 4 is a sectional view of another type of molded resistor according to the invention.

Referring to FIGURE 1 the capacitor 2 is composed of alternating discs of conductor 4 and dielectric 6. The sheets are embedded in a glass bonded levigated alumina composition 8 such as that set forth in Example 1. The metal discs can be made of silver, for example, and the dielectric discs of wax paper.

In FIGURE 2 the capacitor 10 is composed of sheet 12 made of metal, e.g. tinfoil, and sheet 14 made of an insulator, e.g. wax paper which are tightly wrapped as indicated. Encapsulating the sheets 12 and 14 is the glass bonded alumina composition 16 of the present invention, e.g. that of Example 2. In place of wax paper there can be employed other dielectric insulators, e.g. polyethylene or polypropylene or polytetrafluoroethylene or tetrafluoroethylene hexafluoropropylene copolymer. Alternatively, as the dielectric there can be a film of titanium dioxide tenaciously adhered to the metal sheet 12.

FIGURE 3 shows a molded resistor 20 composed of carbon washers 22 stacked close together (in the drawing the spacing between the washers is exaggerated for purpose of clarity in illustration) encapsulated in a glass-bonded alumina composition 24 according to the invention e.g. the composition of Example 3. There is also provided copper wires 26 and 28 on opposite sides of the resistor.

FIGURE 4 shows a resistor 30 composed of carbon powder 32 embedded in a vitreous electrical insulating composition 34 of the invention e.g. the glass bonded alumina composition of Example 4. There is also provided silver wires 36 and 38 on opposite sides of the resistor.

The glass bonded levigated alumina composition of the present invention can also be used in making other insulators e.g. spark plugs.

Typical of the properties of glass bonded alumina compositions according to the invention are the following:

| Property | Non-leaded frit | Leaded frit |
|---|---|---|
| Resistance to heat (° F.) | 700 | 700 |
| Specific gravity | 2.9–3.1 | 3.7–4.1 |
| Specific volume (cu. in./lb.) | 9.5–8.9 | 7.5–6.7 |
| Tensile strength (p.s.i.) | 5,000–7,000 | 6,000–8,000 |
| Modulus of elasticity, $10^6$ p.s.i. | 10–15 | 10–15 |
| Compressive strength (p.s.i.) | 40,000+ | 40,000+ |
| Flexural strength (p.s.i.) | 12,000–15,000 | 15,000–24,000 |
| Impact strength (notched izod, ft. lbs./in.) | 0.5 | 0.6 |
| Thermal conductivity (B.t.u. ft./hr. sq. ft. ° F.) | 1.5–2.0 | 1.5–4.0 |
| Specific heat (cal./° C./gm.) | 0.21 | 0.16 |
| Dielectric strength (volts/mil) | 300 | 250 |
| Dielectric constant, $10^6$ | 7.4–8.2 | 10.0–10.5 |
| Dissipation Factor, $10^6$ | .005 | .001 |
| Arc resistance (sec.) | 280–320 | 320–500+ |

What is claimed is:

1. A molded vitreous electrical insulator prepared by forming a preform of a mixture comprising a glass frit and powdered alumina heating to from 1200 to 1800° F. to sinter the grains, cooling the preform to 600 to 800° F. and then molding at 600 to 20,000 p.s.i.

2. A molded insulator according to claim 1 consisting essentially of 20 to 75% levigated alumina, 20 to 75% glass frit, 0 to 10% cryolite and 0 to 10% mica.

3. An insulator according to claim 2 wherein the glass is a lead glass.

4. An insulator according to claim 2 wherein the glass is a nonlead glass.

5. An insulator according to claim 2 containing cryolite in an amount up to 7%, the amount of cryolite being sufficient to aid the flowability of the mix prior to molding.

6. An insulator according to claim 2 including mica in an amount up to 10%, the mica being sufficient to aid the flowability of the mix prior to molding.

7. A molded product according to claim 6 including cryolite in an amount up to 7%.

8. A molded insulator according to claim 2 in the form of an electrical resistor encapsulated in a glass bonded-levigated alumina composition.

9. A molded insulator according to claim 2 in the form of an electrical capacitor encapsulated in a glass bonded-levigated alumina composition.

10. A process of preparing a molded vitreous electrical insulator comprising making a preform of a composition comprising a glass frit and powdered alumina, heating the preform to 1200 to 1800° F., placing the hot preform in a mold having a temperature of 600 to 800° F. and then molding the preform to form said insulator at 600 to 20,000 p.s.i.

11. A process according to claim 10 wherein the composition consists essentially of 20 to 75% powdered alumina, 20 to 75% frit, 0 to 10% cryolite and 0 to 10% mica.

References Cited

UNITED STATES PATENTS

| | | | |
|---|---|---|---|
| 2,400,337 | 5/1946 | Buechner | 106—46 |
| 2,508,511 | 5/1950 | Goodman | 117—201 X |
| 2,972,180 | 2/1961 | Gulton et al. | 317—261 X |
| 3,222,219 | 12/1965 | Saunders et al. | 106—48 X |
| 3,278,324 | 10/1966 | Nelson | 106—48 X |
| 2,163,407 | 6/1936 | Pulfrich. | |
| 2,303,244 | 11/1942 | Wedlock. | |
| 2,413,441 | 12/1946 | Feichter. | |
| Re. 22,893 | 6/1947 | Wedlock. | |
| 2,566,902 | 9/1951 | Michael. | |
| 2,665,219 | 1/1954 | Thurnauer. | |
| 2,669,764 | 2/1954 | Kilpatrick. | |
| 2,678,889 | 5/1954 | Eictenberg. | |
| 2,782,110 | 2/1957 | Cantrell. | |
| 2,949,376 | 8/1960 | Comer. | |

HELEN M. McCARTHY, Primary Examiner

W. R. SATTERFIELD, Assistant Examiner

U.S. Cl. X.R.

106—46; 264—66